US007160963B2

(12) United States Patent
Chen et al.

(10) Patent No.: US 7,160,963 B2
(45) Date of Patent: Jan. 9, 2007

(54) TONER FUSER MEMBER WITH RELEASE LAYER FORMED FROM SILSESQUIOXANE-EPOXY RESIN COMPOSITION

(75) Inventors: Jiann-Hsing Chen, Fairport, NY (US); Joseph A. Pavlisko, Pittsford, NY (US); Muhammed Aslam, Rochester, NY (US); Nataly Boulatnikov, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 278 days.

(21) Appl. No.: 10/836,782

(22) Filed: Apr. 30, 2004

(65) Prior Publication Data

US 2005/0244648 A1 Nov. 3, 2005

(51) Int. Cl.
*C08L 83/04* (2006.01)

(52) U.S. Cl. ...................... 525/476; 523/435; 428/447; 525/903; 524/588

(58) Field of Classification Search ................ 525/476, 525/903; 523/435; 428/447; 524/588
See application file for complete search history.

(56) References Cited

U.S. PATENT DOCUMENTS 4,027,073 A 5/1977 Clark ......................... 428/412
4,439,509 A 3/1984 Schank ........................ 430/132
4,552,907 A * 11/1985 Sato et al. .................. 523/455
4,595,602 A 6/1986 Schank ......................... 427/76
4,758,491 A 7/1988 Alexandrovich et al. ... 430/110
4,923,775 A 5/1990 Schank ........................ 430/59
5,089,363 A 2/1992 Rimai et al. .................. 430/45
5,200,284 A 4/1993 Chen et al. ................... 430/33
5,233,008 A 8/1993 Chen et al. ................... 528/33
5,330,840 A 7/1994 Chen et al. .............. 428/423.1
5,362,833 A 11/1994 Chen et al. ................... 528/25
5,411,779 A 5/1995 Nakajima et al. ........ 428/36.91
5,529,847 A * 6/1996 Chen et al. ................. 428/413
5,708,948 A * 1/1998 Chen et al. ................. 399/329
5,778,295 A * 7/1998 Chen et al. ................. 399/329
6,177,489 B1 * 1/2001 Okuse et al. ............... 523/451
6,537,723 B1 * 3/2003 Toyoda et al. ........... 430/270.1
6,537,741 B1 3/2003 Chen et al. ................. 430/523
6,630,745 B1 * 10/2003 Osada et al. ................ 257/793

* cited by examiner

*Primary Examiner*—Margaret G. Moore
(74) *Attorney, Agent, or Firm*—Carl F. Ruoff

(57) ABSTRACT

A toner fuser member contains a substrate on which is disposed a toner release surface layer formed from a composition that includes a silsesquioxane and a curable epoxy resin. On curing, the composition forms an interpenetrating polymer network of the silsesquioxane and cured epoxy resin.

23 Claims, No Drawings

TONER FUSER MEMBER WITH RELEASE LAYER FORMED FROM SILSESQUIOXANE-EPOXY RESIN COMPOSITION

FIELD OF THE INVENTION

This invention relates in general to electrostatographic imaging and, in particular, to toner fuser members. More particularly, this invention relates to a fuser member having a release layer formed from a composition containing a silsesquioxane and a curable epoxy resin.

BACKGROUND OF THE INVENTION

In electrostatographic imaging and recording processes such as electrophotographic copying, an electrostatic latent image formed on a photoconductive surface is developed with a thermoplastic toner powder, which is thereafter fused to a receiver. The fuser member can be a roll, belt or any surface having the suitable shape for fixing thermoplastic toner powder to the receiver. The fusing step commonly consists of passing the receiver, for example, a sheet of paper on which toner powder is distributed in an imagewise pattern, through the nip of a pair of rolls. At least one of the rolls is heated; in the case where the fuser member is a heated roll, a smooth resilient surface is bonded either directly or indirectly to the core of the roll. Where the fuser member is in the form of a belt, it is preferably a flexible endless belt having a smooth, hardened outer surface that passes around the heated roller. A persistent problem with electrostatographic fusing systems, known as offset, is the adhesion of heat-softened toner particles to the surface of the fuser member rather than the receiver during passage through the rolls. Any toner remaining adhered to the fuser member can cause a false offset image to appear on the next sheet that passes through the rolls and can also degrade the fusing performance of the member. Another possible problem is degradation of the member surface caused by continued heating, which results in an uneven surface and defective patterns in thermally fixed images.

Toner fuser rolls are composed of a cylindrical core that may include a heat source in its interior, and a resilient covering layer formed directly or indirectly on the surface of the core. A thin layer of a suitable primer is may be coated on the surface of the core in order to improve bonding of the layer. Roll covering layers are commonly made of fluorocarbon polymers or silicone polymers, for example, poly(dimethylsiloxane) polymers of low surface energy, which minimizes adherence of toner to the roll. Frequently, release oils such as poly(dimethylsiloxanes) are also applied to the fuser roll surface to prevent adherence of toner to the roll. Such release oils may interact with the resilient layer upon repeated use and in time cause swelling, softening, and degradation of the roll. Silicone rubber covering layers that are insufficiently resistant to release oils and cleaning solvents are also susceptible to delamination of the roll cover after repeated heating and cooling cycles.

Toner fuser belts are composed of a continuous flexible material having superior resistance to heat and a smooth surface. The belt substrate can be metallic or polymeric. The surface of the belt is composed of a thinly coated, low surface energy polymer such as a fluorocarbon or a silicone resin. There is a need for coating compositions which adhere strongly to the belt and form a hard, tough surface that is resistant to wear and cracking. The surface should also be resistant to cleaning solvents and fluids.

In electrostatographic imaging processes dry developers can be used to form an image on a receiving surface such as a sheet of paper. Dry developers usually comprise a toner powder and carrier particles. Carrier particles and toner particles have different triboelectric values. As the developer mixture is agitated, the particles rub together and the toner and carrier particles acquire opposite electric charges and cling together. In the subsequent development step the somewhat higher opposite charge of the electrostatic latent image draws the colored toner from the carrier and develops the image. Various addenda are frequently used to improve the properties of the toner and carrier particles.

Toners comprise, as a major component, the binder and, as minor components, a colorant and a charge control agent. The binder can be any resin having properties suitable for dry toners. Many such resins are known, but thermoplastic resins that are fixable by fusing are especially useful. When a dry toner powder image is transferred from one surface to another, defects in the image can occur. U.S. Pat. No. 4,758,491 teaches that the addition of low surface energy addenda, especially polymers containing organopolysiloxane segments, may alleviate such defects.

Carrier particles comprise magnetizable irregular particles that are usually coated with a film of a polymeric material, which helps develop the triboelectric charge and aids the transfer of the toner. The coating material must adhere well to the carrier particle because the toner charge decreases as the polymer wears off. Polymers with low surface energy properties are especially useful for coating carrier particles.

Recent electrophotographic apparatus and processes are disclosed in U.S. Pat. Nos. 5,089,363 and 5,411,779, the disclosures of which are incorporated herein by reference. U.S. Pat. No. 5,411,779 describes an apparatus having an image-fixing belt with a polyimide resin inner layer and a fluoroplastic outer layer that produces unglossed, matte images. Other fuser belt systems are described in U.S. Pat. Nos. 5,200,284; 5,233,008; 5,330,840; 5,362,833; and 5,529,847, the disclosures of which are incorporated herein by reference.

The ferrotyping belt used for the production of high gloss toner images typically consists of a metal or an organic polymeric substrate on which is coated a release layer. The toner is generally fused in a heated nip to a receiver, which then continues to travel along the belt without releasing until the toner is cool. To avoid the use of a release oil, the release layer of the fuser belt must have low surface energy.

Toner fuser belts are composed of a continuous smooth, heat-resistant, flexible material on a metallic or polymeric substrate. A release layer applied to the belt substrate is a thinly coated, low surface energy polymer such as a fluorocarbon or a crosslinked silicone resin. Such release layers, however, often display poor mechanical properties, including inadequate adhesion to the metal support, and are susceptible to rapid wear upon repeated contact with abrasive receiving sheets such as bond paper or uncoated laser print paper.

There remains an ongoing need for fuser belts having durable surface layer compositions that adhere well to the substrate, form a hard, tough surface that is resistant to wear, cracking and solvents, and are capable of producing multiple high quality, high gloss toner images, including multicolor images. This need is well met by the toner fuser belt of the present invention.

SUMMARY OF THE INVENTION

The present invention is directed to a toner fuser member that comprises a substrate, on which is disposed a toner release surface layer formed from a composition that comprises a silsesquioxane and a curable epoxy resin. On curing, the composition forms an interpenetrating polymer network of the silsesquioxane and cured epoxy resin.

DETAILED DESCRIPTION OF THE INVENTION

In accordance with the present invention, a toner fuser member, preferably a fuser belt having a surface layer coated on a metallic or an organic polymeric substrate, provides high gloss, durability, and good release of toner images without the need for a release agent such as an oil. The fuser belt, whose substrate preferably comprises a polyimide resin, can be employed in a fusing apparatus such as that described in U.S. Pat. No. 5,778,295, the disclosure of which is incorporated herein by reference. Fused toner images, including multicolor images, obtained with the belt exhibit high gloss and excellent clarity.

Silsesquioxanes are a class of inorganic/organic glasses that can be formed at moderate temperatures by a procedure commonly referred to as a "sol-gel" process. In the sol-gel process, silicon alkoxides are hydrolyzed in an appropriate solvent, forming the "sol." The solvent is then removed, resulting in the formation of a cross-linked "gel." A variety of solvents can be used, aqueous, aqueous-alcoholic, and alcoholic solvents being generally preferred. Silsesquioxanes are conveniently coated from acidic alcohols, since the silicic acid form, $RSi(OH)_3$, is quite stable in solution for months under ambient conditions. The extent of condensation is related to the amount of curing a sample receives, temperature and time being among the two most important variables.

Silsesquioxanes can be represented by the formula $(RSiO_{1.5})_n$, where R is an organic group and n is the number of repeating units. Thus, the prefix "sesqui" refers to a one and one-half stoichiometry of oxygen. The polymers can be prepared by the hydrolysis and condensation of trialkoxysilanes. $(RSiO_{1.5})_n$, which is sometimes written $[Si(O_{0.5})_3R_n]$, is a useful shorthand for silsesquioxanes but, except for fully cured silsesquioxane, it does not totally characterize the material. This is important, since silsesquioxanes can be utilized in an incompletely cured state. An additional nomenclature, derived from one described in R. H. Glaser, G. L. Wilkes, C. E. Bronnimann; *Journal of Non-Crystalline Solids,* 113 (1989) 73–87; uses the initials M, D, T, and Q to designate silicon atoms bonded to 1, 2, 3, or 4 oxygen atoms, respectively. The designation T is subdivided to indicate the number of —Si—O—Si— bonds, from 0 to 3, contained in the silsesquioxane structure, i.e., $T^0$, $T^1$, $T^2$, and $T^3$.

In fully cured silsesquioxanes, substantially all silicons are included in $T^3$ structures. The extent of curing of the silsesquioxane can be quantified as the ratio of $T^2$ to $T^3$. The value of this $T^2/T^3$ ratio decreases with an increase in cure, and vice versa. In the silsesquioxanes having the most advantageous properties for inclusion in a toner fusing belt surface layer in accordance with the invention, the ratio of carbon to silicon atoms, i.e., the C:Si ratio, is greater than about 2:1, and the $T^2/T^3$ ratio is from about 0.5:1 to about 0.1:1. The silsesquioxane is a large oligomer or a polymer typically containing more than 10 silsesquioxane subunits, although theoretically there is no upper limit on the number of subunits.

U.S. Pat. No. 4,027,073 teaches the use of silsesquioxanes as abrasion resistant coatings on organic polymers. Typical applications include scratch resistant coatings on acrylic lenses and transparent glazing materials; the cited patent teaches that a preferred thickness for good scratch resistance is from 2 to 10 μm. U.S. Pat. No. 4,439,509 teaches photoconducting elements for electrophotography that have silsesquioxane coatings having a thickness of 0.5 to 2.0 μm, which is purported to optimize electrical, transfer, cleaning and scratch resistance properties. This teaching contrasts with that of U.S. Pat. No. 4,027,073, which teaches that a preferred thickness of a silsesquioxane layer for good scratch resistance is from 2 to 10 μm. U.S. Pat. No. 4,923,775 teaches that methylsilsesquioxane is preferred since it produces the hardest material in comparison to other alkylsilanes. U.S. Pat. No. 4,595,602 teaches a conductive overcoat of cross-linked "siloxanol-colloidal silica hybrid" having a preferred thickness of from 0.3 to 5.0 μm. U.S. Pat. No. 5,778,295 discloses a toner fusing belt that has an intermediate layer of highly crosslinked silicone resin and a silsesquioxane surface layer on a polyimide resin belt. U.S. Pat. No. 6,537,741 discloses a fusing belt that is used to fuse a coating to a photographic element and comprises a surface layer formed from a cured silsesquioxane composition and an epoxy primer adhesive layer between the surface layer and the substrate. The disclosures of all of these cited patents are incorporated herein by reference.

A useful material for preparation of the toner release surface layer of the present invention is GE AS 4700, a silsesquioxane sol-gel that is derived from methyltrimethoxysilane and is available from General Electric Company. Preferably, the toner release surface layer has a thickness of about 1 μm to about 20 μm, more preferably, about 3 μm to about 15 μm.

In addition to the silsesquioxane component, the composition used to form the toner release surface layer of the fuser member includes a curable epoxy resin, which preferably is a crosslinked, glycidyl end-capped bisphenolic polymer having the formula

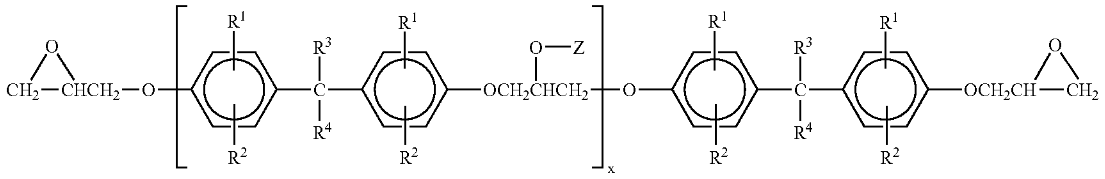

where $R^1$ and $R^2$ are each independently H or an alkyl group containing 1 to about 4 carbon atoms, and $R^3$ and $R^4$ are each independently H, F, or an alkyl group containing 1 to about 4 carbon atoms, Z is a carbonyl cross-linking group, and x is an integer from 1 to about 10.

The bisphenolic epoxy resin is cross-linked by a difunctional dicarbonylsubstituted crosslinking agent, preferably a dianhydride such as pyromellitic anhydride or a diimide. The weight ratio of epoxy resin: crosslinking agent is preferably about 2:1 to about 5:1, more preferably about 3.3:1.

Bisphenol epoxy resins useful in the present invention are commercially available and include, for example, HYSOL™ EA 9369 QT, a crosslinked Bisphenol F epoxy resin, available from Dexter Aerospace, and STYCAST™ W-66 black resin and crosslinking catalyst 17M-1, a two-component formulation from Emerson & Cuming Inc., Lexington Mass.

While fuser member surface layers formed from silsesquioxane sol-gels have good toner release properties, they tend to be brittle, resulting in poor wear characteristics. A coating composition of the present invention, in which a silsesquioxane is combined with a curable epoxy resin, forms an interpenetrating polymer network (IPN) upon curing, thereby providing a tough release layer having excellent wear characteristics. The coating composition contains the silsesquioxane and epoxy resin in a silsesquioxane: epoxy resin weight ratio preferably of about 12:1 to about 2:1, more preferably, about 6:1 to about 4:1.

The toner release surface layer composition of the present invention may further include a filler such as $SiO_2$, $TiO_2$, $ZnO$, $SnO_2$, or $Al_2O_3$, or mixtures thereof, in an amount ranging from about 1 wt. % to about 30 wt. %. Preferably, the filler is $SiO_2$, in an amount from about 1 wt. % to about 7 wt. %.

The following examples serve to illustrate the present invention:

EXAMPLE 1

Preparation of Solutions for Formation of Surface Release Layers

A solution of 60 g of STYCAST™ W-66 black epoxy resin in 240 g THF is stirred overnight to give Part A.

A solution of 27 g of the crosslinking pyromellitic anhydride catalyst 17M-1 in 273 g THF is shaken for 5 minutes to give Part B.

The silsesquioxane sol-gel GE AS-4700 is filtered at room temperature by gravity through a Whatman glass microfibre filter GF/A, giving Part C.

EXAMPLE 2

Preparation of Comparison Toner Fuser Belt with Silsesquioxane Surface Layer

A polyimide belt substrate manufactured by Nitto Denko is cleaned with pressurized air to remove dust, cleaned first with acetone and then with alcohol using SPEC-WIPE™ 4 knitted polyester clean room wipers, and again cleaned with pressurized air.

The cleaned polyimide belt substrate is coated with primer SHP 401, as recommended by General Electric Co., and ring coated at a speed of 0.338 in/sec with the silsesquioxane solution Part C. The coated substrate is dried for 30 minutes at room temperature, ramped to a temperature of 150° C. over a period of 4 hours, held at 150° C. for 2 hours, and cooled to provide comparison fuser belt C-1, having a release layer thickness of 12 μm.

EXAMPLE 3

Preparation of Toner Fuser Belts with Cured Silsesquioxane-Epoxy Resin IPN Surface Layer Fuser belts I-1, I-2, I-3, and I-4 are prepared using the following formulations, which are coated polyimide belt substrates that are cleaned as described in Example 2 but are not primed:

I-1: To a mixture of 15.38 grams Part A (20 wt. % solids) and 15.38 grams Part B (9 wt. % solids) is added 220 grams Part C (24.3 wt. % solids)

I-2: To a mixture of 30.76 grams Part A (20 wt. % solids) and 30.76 grams Part B (9 wt. % solids) is added 220 grams Part C (24.3 wt. % solids)

I-3: To a mixture of 46.14 grams Part A (20 wt. % solids) and 46.14 grams Part B (9 wt. % solids) is added 220 grams Part C (24.3 wt. % solids)

I-4: To a mixture of 92.28 grams Part A (20 wt. % solids) and 92.28 grams Part B (9 wt. % solids) is added 220 grams Part C (24.3 wt. % solids)

Ring coating and curing of the toner release surface layers is carried out as described in Example 2. The weight ratios of silsesquioxane:epoxy resin in the cured surface layer coatings and the thicknesses of the cured layers are as follows:

| | | |
|---|---|---|
| I-1: | 12:1 | 3 μm |
| I-2: | 6:1 | 5 μm |
| I-3: | 4:1 | 15 μm |
| I-4: | 2:1 | 6 μm |

EXAMPLE 4

Adhesion of Surface Layer to Fuser Belt Substrate

The adhesion of the coated surface layers of comparison belt C-1 and belts I-1, I-2, I-3, and I-4 of the invention is evaluated using the method of ASTM D3359-95A. Comparison belt C-1, in which the silsesquioxane layer is coated on a substrate previously coated with a manufacturer-recommended primer, shows substantial delamination, >65%, for a 0B rating. Using the same test method, the belts of the invention I-1, I-2, I-3, and I-4 all exhibit substantially no delamination, reflected in the highest possible rating, 5B. Thus, formation of the cured silsesquioxane-epoxy resin surface toner release layer requires no priming of the substrate to ensure excellent adhesion.

EXAMPLE 5

Measurement of Gloss of Coated Fuser Belts

The Gardner gloss value is a ratio determined by measuring the amount of light reflected off a fuser belt surface at a specific angle measured from a line perpendicular to the belt surface, and dividing the foregoing by the amount of light introduced to the surface at the same angle on the opposite side of the perpendicular line. The angles off the perpendicular line at which the gloss measurements are commonly taken are 20°, 60°, and 85° using a Gardner MICRO-TRI-GLOSS 20-60-85 Glossmeter, available from BYK Gardner USA of Rivers Park Md. The gloss value as measured by the Gardner Glossmeter is often reported as a G next to a number representing the size of the specific angle used in measuring gloss, for example, G20, G60, and G85.

Gloss measurements are made on comparison belt C-1 and on belts I-1, I-2, I-3, and I-4 of the invention. Gardner gloss levels measured at an angle of 20° are presented as G20 gloss values in TABLE 1 for each of the fuser belts. It should be noted that the measured gloss values of fused toner images obtained using these belts are substantially the same as the fuser belt surface gloss values.

EXAMPLE 6

Effect of Incubation on Measured G20 Gloss Values

To evaluate the effect of incubation on gloss values, comparison belt C-1 and on belts I-1, I-2, I-3, and I-4 of the invention are incubated at 175° C. for 35 days. Changes in G20 gloss, expressed as percentage change, either decrease or increase, are also presented in TABLE 1.

TABLE 1

| Fuser Belt | Surface Release Layer | G20 Gloss | G20 % Change after 175° C. Incubation | Thick-ness (μm) | Wear Cycles at 275° C. (5 μm wear) |
|---|---|---|---|---|---|
| C-1 | silsesquioxane | 90 | 10.5 | 12 | 100 |
| I-1 | silsesquioxane:epoxy (12:1) | 79 | 26.8 | 3 | 250 |
| I-2 | silsesquioxane:epoxy (6:1) | 81 | −6.8 | 5 | 200 |
| I-3 | silsesquioxane:epoxy (4:1) | 83 | 0.48 | 15 | 200 |
| I-4 | silsesquioxane:epoxy (2:1) | 88 | −8.3 | 6 | 117 |

EXAMPLE 7

Wear Tests of Fuser Belts

The wear rates of comparison belt C-1 and belts I-1, I-2, I-3, and I-4 are measured using a Norman Abrasion Wear Tester (Norman Tool Inc., Evansville Ind.). The wear tests are carried out at 275° F., and the wear cycles are continued until the coating has worn through to the substrate. The results for each belt, reported as wear cycles normalized to a layer thickness of 5 μm, are also included in TABLE 1.

As shown by the G20 gloss measurement data included in TABLE 1, the fuser belts having the cured silsesquioxane-epoxy resin IPN surface layers have desirably high gloss values that approach the value of the surface layer formed from silsesquioxane alone. The I-3 and I-4 layers with the relatively low silsesquioxane:epoxy resin ratios, 4:1 and 2:1, have the highest gloss.

Also as shown in TABLE 1, incubation of comparison belt C-1 causes a substantial reduction in the G20 gloss value, as it also does for belt I-1, whose surface layer is formed from 12:1 silsesquioxane:epoxy resin. On the other hand, the gloss of belts I-2, I-3, and I-4 is substantially unchanged upon incubation, with I-2 and I-4 actually showing a slight increase in the G20 gloss value.

The results presented in TABLE 1 also illustrate the improvement in wear provided by the cured silsesquioxane-epoxy resin IPN surface layers of the present invention, with belts I-1, I-2, and I-3 showing at least a twofold improvement in wear resistance relative to the comparison layer.

Thus, the present invention provides durable, high gloss toner release surface layers that adhere very well to a substrate without need for a primer pre-treatment.

The invention has been described in detail with particular reference to certain preferred embodiments thereof, but it is understood that variations and modifications can be effected within the spirit and scope of the invention, which is defined by the claims that follow.

What is claimed:

1. A toner fuser member comprising:

a substrate; and disposed on said substrate, a toner release surface layer formed from a composition that comprises a silsesquioxane and a curable epoxy resin that is crosslinked by a crosslinking agent comprising a diimide or a dianhydride, said composition forming on curing an interpenetrating polymer network of said silsesquioxane and said cured epoxy resin.

2. The toner fuser member of claim 1, wherein said curable epoxy resin comprises a glycidyl end-capped polyether.

3. The toner fuser member of claim 2, wherein said curable epoxy resin comprises a crosslinked, glycidyl end-capped bisphenolic polymer having the formula

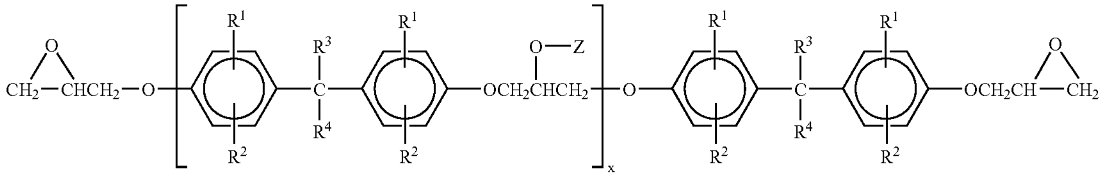

where $R^1$ and $R^2$ are each independently H or an alkyl group containing 1 to about 4 carbon atoms, and $R^3$ and $R^4$ are each independently H, F, or an alkyl group containing 1 to about 4 carbon atoms, Z is a carbonyl cross-linking group, and x is an integer from 1 to about 10.

4. The toner fuser member of claim 1, wherein said crosslinking agent comprises pyromellitic anhydride.

5. The toner fuser member of claim 3, wherein said composition comprises said glycidyl end-capped bisphenolic polymer and said crosslinking agent in a weight ratio of about 2:1 to about 5:1.

6. The toner fuser member of claim 5, wherein said toner composition comprises said glycidyl end-capped bisphenolic polymer and said crosslinking agent in a weight ratio of about 3.3:1.

7. The toner fuser member of claim 1, wherein said composition contains said silsesquioxane and said curable epoxy resin in a silsesquioxane: epoxy resin weight ratio of about 12:1 to about 2:1.

8. The toner fuser member of claim 7, wherein said composition contains said silsesquioxane and said curable epoxy resin in a silsesquioxane: epoxy resin weight ratio of about 6:1 to about 4:1.

9. The toner fuser member of claim 1, wherein said composition further comprises a filler selected from the group consisting of $SiO_2$, $TiO_2$, ZnO, $SnO_2$, $Al_2O_3$, and mixtures thereof.

10. The toner fuser member of claim 9, wherein said composition comprises said filler in an amount of about 1 wt. % to about 30 wt. %.

11. The toner fuser member of claim 10, wherein said filler is $SiO_2$ in an amount of about 1 wt. % to about 7 wt. %.

12. The toner fuser member of claim 1, wherein said silsesquioxane has a C:Si ratio greater than about 2:1.

13. The toner fuser member of claim 1, wherein said silsesquioxane has a $T^2/T^3$ ratio of from about 0.5:1 to about 0.1:1.

14. The toner fuser member of claim 1, wherein said silsesquioxane is formed from a mixture comprising methyltrimethoxysilane.

15. The toner fuser member of claim 1, wherein said member is a fuser belt.

16. The toner fuser member of claim 15, wherein said fuser belt comprises a substrate formed of metal.

17. The toner fuser member of claim 16, wherein said metal is selected from the group consisting of steel, stainless steel, aluminum, copper, and nickel.

18. The toner fuser member of claim 15, wherein said fuser belt comprises a substrate formed of a thermoset organic polymeric material.

19. The toner fuser member of claim 18, wherein said thermoset organic polymeric material is selected from the group consisting of a polyimide, a polyamide, a polyamide-imide, a polycarbonate, and a polyester.

20. The fuser member of claim 19, wherein said thermoset organic polymeric material comprises a polyimide.

21. The toner fuser member of claim 1, wherein said surface layer has a thickness of about 1 μm to about 20 μm.

22. The toner fuser member of claim 21, wherein said thickness is about 3 μm to about 15 μm.

23. The toner fuser member of claim 1, wherein said substrate is unprimed.

* * * * *